Patented Mar. 13, 1934

1,950,827

UNITED STATES PATENT OFFICE 1,950,827

PROCESS FOR THE MANUFACTURE OF ALKYL HALIDES

Ernst Teupel, Leverkusen-I. G.-Werk, Germany, assignor to I. G. Farbenindustrie Aktiengesellschaft, Frankfort-on-the-Main, Germany No Drawing. Application April 14, 1931, Serial No 530,145. In Germany April 29, 1930

10 Claims. (Cl. 260—162)

The present invention relates to a process of preparing alkyl halides.

In accordance with my invention, alkyl halides, such as chlorides, bromides and iodides, are prepared by causing a mixture of the corresponding saturated aliphatic alcohol with aqueous hydrochloric, hydrobromic or hydroiodic acid to react at temperatures between about 110 and about 180° C., while avoiding the formation of the vapor phase of the starting materials, that is to say, maintaining a liquid phase.

Instead of alcohols of the kind specified there may be employed the corresponding esters with sulfuric acid, for example, alkyl or dialkyl sulfates or mixtures of the alcohols with the sulfuric acid esters.

Up to now alkyl halides have been produced by slow heating of the corresponding alcohols with sodium chloride, bromide or iodide and sulfuric acid. When this process is carried out commercially the question of apparatus presents difficulties inasmuch as all metals except silver and the still more valuable noble metals are attacked by the hydrogen halide acid present. The large quantities of water involved in the reaction necessitate such a large size of the reaction vessel that the use of silver becomes uneconomical in consequence of the surface to be coated. Moreover, all these processes suffer from the defect, that besides the alkyl halides ethers are formed in considerable quantity.

In accordance with the present invention alkyl halides, quite generally, say from 1 to 18 carbon atoms, are produced in comparatively small apparatus by a process which can be carried out continuously.

The present invention is based on the observation that the formation of alkyl chlorides, bromides or iodides from alcohols, alkyl sulfuric acids or dialkyl sulfates and aqueous hydrogen halide acids is markedly accelerated at temperatures exceeding 100° C., say between 110 and 180° C., provided that such a pressure is maintained in the reaction vessel that all the starting materials are kept in the liquid state, since in the gaseous phase practically no reaction occurs. Accordingly the pressure must be higher than the vapor pressure of the starting material possessing the lowest boiling point, which will usually be the hydrogen halide acid. In the manufacture of the alkyl chlorides of low boiling point, such as ethyl chloride and propyl chloride it will be advantageous to keep the pressure in the neighbourhood of the vapor pressures of these substances at the temperature of working.

The velocity of the reaction increases very quickly with increasing temperature in such a manner that, for example, at 130° C. the reaction is complete in 15 to 20 minutes, at 150° C. in 3 to 5 minutes and at 170° C. in about 2 minutes. In spite of the high temperature the formation of dialkyl ethers is very slight since these ethers, in so far as they should be produced, are in turn converted by hydrogen halide acids into the alkyl halides. Furthermore formation of olefines does not appear to occur even at the highest temperatures. Since only liquid materials react with one another and the times of reaction are so very short, the new process presents the advantage that it can be carried out continuously, which renders possible the working with very small apparatus with the result that the use of noble metals, in particular silver, becomes an economical proposition.

Moreover, the alkyl sulfuric acids and the dialkyl sulfates, which in many cases can be procured more cheaply than the corresponding alcohols can be used with equal advantage. For the reaction one molecule of the compound containing the alkyl group, either in the form of alcohol, alkyl sulfuric acid or dialkyl sulfate is with advantage mixed with slightly more than one molecule of aqueous hydrogen halide acid and heated in pressure vessels to temperatures exceeding 100° C. The pressure vessels, when of appropriate construction, can be charged continuously, an over-flow valve on the exit side ensuring the maintenance of the requisite pressure.

The following examples will illustrate the invention without limiting it thereto:

*Example 1.*—A mixture of 10 kgs. of ethyl alcohol and 24 kgs. of 35% commercial hydrochloric acid is forced under pressure through a tube or bundle of tubes or other apparatus suitable for heat exchange, the inner surface whereof is coated with silver. The reaction mixture is heated in this apparatus to 125° C. The velocity of flow must be adjusted thus that the mixture flows through the reaction chamber in 25 minutes. After a few minutes the pressure adjusts itself to about 16 atmospheres. At the end of the reaction space the mixture, now consisting of ethyl chloride and water with a few per cent. of hydrochloric acid, is either cooled, whereupon the ethyl chloride separates, and then removed in the liquid state or the pressure is released, whereupon the ethyl chloride volatilizes and is condensed after washing and drying. The yield amounts to about 85% of the theoretical.

As compared with the customary processes 10 to 50 times the amount of ethyl chloride is produced in an equal time using a reaction chamber of equal size.

*Example 2.*—10 kgs. of methyl alcohol and 55 kgs. of 40% aqueous hydrobromic acid are heated to 140° C. as described in Example 1. The reaction is complete in 6 minutes at a pressure of 25 atmospheres.

*Example 3.*—A mixture of 21 kgs. of ethyl sulfuric acid and 17.5 kgs. of aqueous hydrochloric acid (specific gravity 1.15) is forced under pressure through a heated tube in such a manner that the temperature in the interior of the tube amounts to 140° C. The velocity of flow is such that the mixture passes through the apparatus in 10 minutes and the pressure amounts to 24 atmospheres. The ethyl chloride is distilled off from this mixture, purified by washing with water and sulfuric acid and condensed. The yield of ethyl chloride amounts to 90 to 95% of the theoretical.

*Example 4.*—15 kgs. of diethyl sulfate and 24 kgs. of aqueous hydrochloric acid (specific gravity 1.15) are heated simultaneously to 140° C. in a pressure vessel provided with a rapidly running stirring apparatus. The pressure rises to 24 atmospheres. After 10 minutes the ethyl chloride produced is drawn off and purified as described in Example 1. The waste liquor, consisting of an approximately 30% sulfuric acid, is forced out, after which the vessel can be recharged.

*Example 5.*—15 kgs. of butyl sulfuric acid and 13 kgs. of aqueous hydrochloric acid (specific gravity 1.15) are forced under pressure through a heated tube, a temperature of about 130° C. being maintained in the interior of the tube. The reaction proceeds at a pressure of about 10 atmospheres and is complete in 15 minutes, during which time the mixture has passed through the tube. The butyl chloride is drawn off in the liquid form at the other end of the tube together with the waste liquor, separated from the water and washed with sodium carbonate solution. The yield amounts to 94% of the theoretical.

*Example 6.*—8 kgs. of decyl alcohol are dissolved in 2 kgs. of sulfuric acid and heated for 15 minutes to 150° C. with 6 kgs. of aqueous concentrated hydrochloric acid. The yield amounts to 85 to 90% of the theoretical.

*Example 7.*—60 kgs. of propyl alcohol are treated with 50 kgs. of sulfuric acid 96% and 130 kgs. of aqueous hydrochloric acid 30% as described in Example 3. The yield amounts to 96 to 98% of the theoretical.

*Example 8.*—60 kgs. of isopropyl alcohol are heated for 3 to 8 minutes at a temperature of 140° C. with 25 kgs. of sulfuric acid and 130 kgs. of aqueous hydrochloric acid 30%. The purification is performed as described in Example 3. The yield of isopropyl chloride amounts to 95% of the theoretical.

*Example 9.*—1 kg. of stearic alcohol is emulsified with 0.8 kg. of aqueous concentrated hydrochloric acid and heated for half an hour at a temperature of 140–150° C. The yield of stearic chloride amounts to 90% of the theoretical.

*Example 10.*—10 kgs. of n-butylalcohol are heated for 10 minutes to a temperature of 130° C. with 33 kgs. of aqueous hydriodic acid of 50% strength. The yield of n-butyliodide is quantitative.

I claim:

1. The process which comprises causing a compound of the group consisting of saturated aliphatic alcohols and sulfuric acid esters thereof, and a hydrohalic acid in a quantity slightly more than theoretically necessary for the formation of the alkyl halide to react upon each other in aqueous solution at a temperature between about 110 and about 180° C., while avoiding the formation of a vapor phase of the starting materials by putting the system under a pressure above the vapor pressure of the reactants and products.

2. The process which comprises causing a compound of the group consisting of saturated aliphatic alcohols and sulfuric acid esters thereof, and hydrochloric acid in a quantity slightly more than theoretically necessary for the formation of the alkyl chloride to react upon each other in aqueous solution at a temperature between about 110 and about 180° C., while avoiding the formation of a vapor phase of the starting materials by putting the system under a pressure above the vapor pressure of the reactants and products.

3. The process which comprises causing a compound of the group consisting of saturated aliphatic alcohols of from 1 to 18 carbon atoms and sulfuric acid esters thereof, and a hydrohalic acid in a quantity slightly more than theoretically necessary for the formation of the alkyl halide to react upon each other in aqueous solution at a temperature between about 110 and about 180° C., while avoiding the formation of a vapor phase of the starting materials by putting the system under a pressure above the vapor pressure of the reactants and products.

4. The process which comprises causing a compound of the group consisting of saturated aliphatic alcohols of from 1 to 18 carbon atoms and sulfuric acid esters thereof, and hydrochloric acid in a quantity slightly more than theoretically necessary for the formation of the alkyl chloride to react upon each other in aqueous solution at a temperature between about 110 and about 180° C., while avoiding the formation of a vapor phase of the starting materials by putting the system under a pressure above the vapor pressure of the reactants and products.

5. The process which comprises causing ethyl sulfuric acid and hydrochloric acid in a quantity slightly more than theoretically necessary for the formation of ethyl chloride to react upon each other in aqueous solution at a temperature between about 110 and about 180° C., while avoiding the formation of a vapor phase of the starting materials by putting the system under a pressure above the vapor pressure of the reactants and products.

6. The process which comprises causing 21 kgs. of ethyl sulfuric acid and 17.5 kgs. of aqueous hydrochloric acid of a specific gravity of 1.15 to react upon each other at a temperature of about 140° C., while avoiding the formation of a vapor phase of the starting materials by putting the system under a pressure above the vapor pressure of the reactants and products.

7. The process which comprises causing propyl sulfuric acid and hydrochloric acid in a quantity slightly more than theoretically necessary for the formation of propyl chloride to react upon each other in aqueous solution at a temperature between about 110 and about 180° C., while avoiding the formation of a vapor phase of the starting materials by putting the system under a pressure above the vapor pressure of the reactants and products.

8. The process which comprises heating a mixture of 60 kgs. of propyl alcohol, 50 kgs. of sulfuric acid of 96% strength and 130 kgs. of aqueous hydrochloric acid of 30% strength at a temperature of about 140° C., while avoiding the formation of a vapor phase of the starting materials by putting the system under a pressure above the vapor pressure of the reactants and products.

9. The process which comprises causing butyl sulfuric acid and hydrochloric acid in a quantity slightly more than theoretically necessary for the formation of butyl chloride to react upon each other in aqueous solution at a temperature between about 110 and about 180° C., while avoiding the formation of a vapor phase of the starting materials by putting the system under a pressure above the vapor pressure of the reactants and products.

10. The process which comprises heating a mixture of 15 kgs. of butyl sulfuric acid and 13 kgs. of aqueous hydrochloric acid of a specific gravity of 1.15 at a temperature of about 130° C., while avoid the formation of a vapor phase of the starting materials by putting the system under a pressure above the vapor pressure of the reactants and products.

ERNST TEUPEL.